July 24, 1923.
J. A. PIERCE
COOKING UTENSIL
Filed Jan. 12, 1923
1,462,818
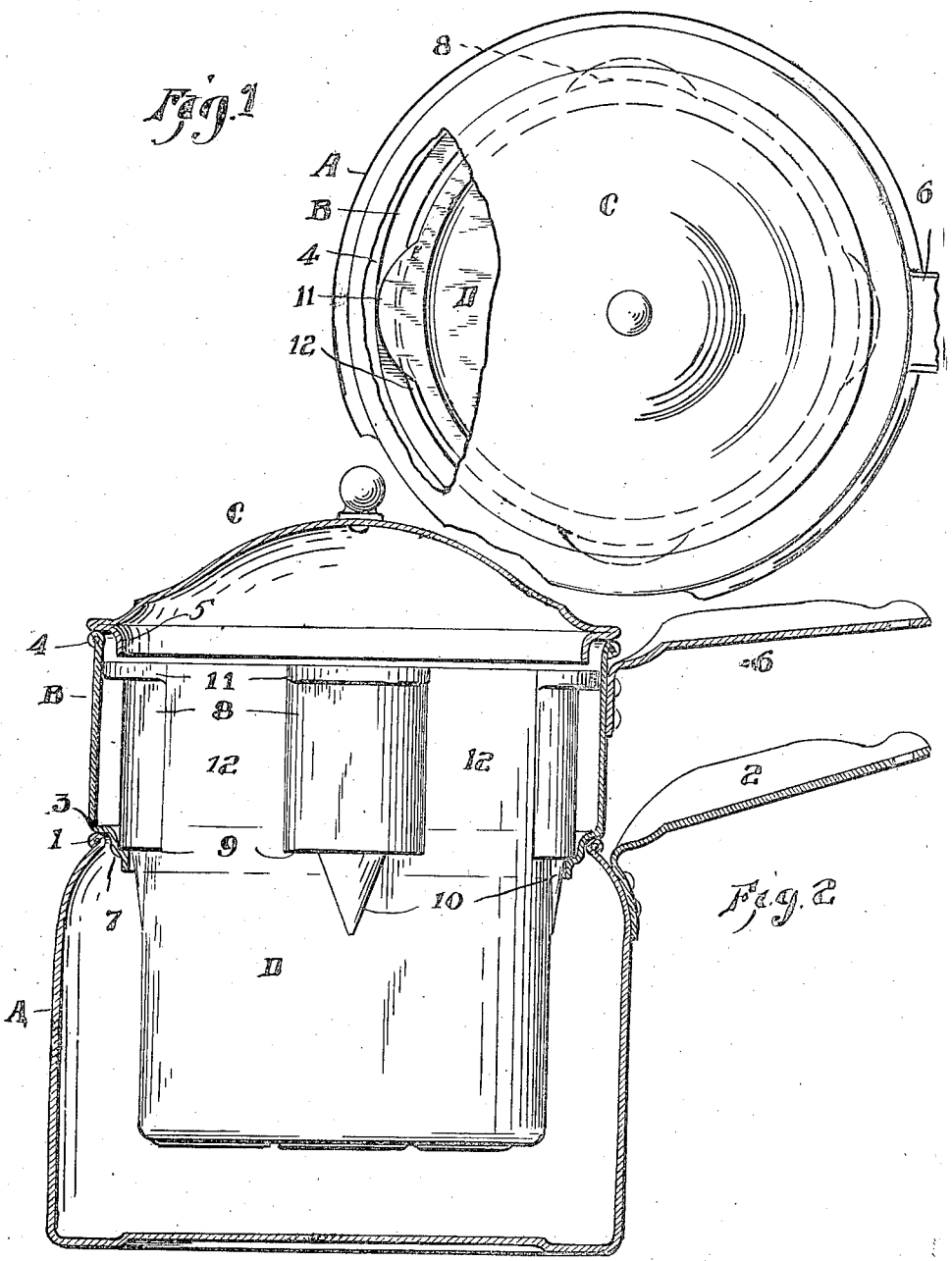

Patented July 24, 1923.

1,462,818

UNITED STATES PATENT OFFICE.

JOSEPH AUDLEY PIERCE, OF DRAVOSBURG BOROUGH, PENNSYLVANIA.

COOKING UTENSIL.

Application filed January 12, 1923. Serial No. 612,188.

*To all whom it may concern:*

Be it known that I, JOSEPH AUDLEY PIERCE, a citizen of the United States, and residing in the borough of Dravosburg, in the county of Allegheny and State of Pennsylvania, have invented or discovered the new, useful, and Improved Cooking Utensil, of which the following is a specification.

My invention consists in certain new and useful improvements in the class of cooking utensils commonly known as "steam cookers", and wherein the food to be cooked is contained in an inner vessel which depends into an outer vessel, which latter contains water to be boiled to generate steam.

My invention relates to that type of steam cookers wherein the inner vessel is supported by a steam ring in such a manner that the ascending steam, generated in the outer vessel, comes into direct contact with and envelopes the entire wall surface of the inner vessel.

More particularly my present invention comprises new and useful improvements in the steam ring, and also in the inner vessel in which the food to be cooked is contained.

In the accompanying drawings, Fig. 1 is a top plan view of a steam cooker embodying the principles of my invention, the lid being partially broken away to show the steam ring and the inner vessel, and Fig. 2 is a vertical, diametric section of the same, the inner vessel being, however, shown in elevation.

The following is a detailed description of the drawings.

A represents the outer vessel, adapted to contain water, and which may be of the usual design of such vessels, preferably having a somewhat contracted top with a beaded edge 1. 2 is the handle of the outer vessel A.

B represents the steam ring, preferably stamped or otherwise formed of metal and provided near its lower end with an external shoulder 3 by means of which the steam ring is mounted on the top of the vessel A with its lower end extending down into the top of said vessel to hold the ring properly in place. The top of the steam ring B is provided with a beaded edge 4.

C is the lid adapted to act as a top closure for the steam ring and preferably provided with a depending annular flange 5 to prevent lateral displacement of the lid. Said flange is preferably stepped in sufficiently so that it will fit inside the beaded edge 1 of the vessel A, so that said vessel when used alone may be covered with the lid C.

The steam ring B is preferably provided with a handle 6.

Near its lower end, the steam ring, below the shoulder 3, is provided an internal, annular shoulder 7.

D is the inner vessel. I prefer to use heat-resisting glass as the material of such inner vessel, but it will be understood that pottery, enameled metal, aluminum or any other suitable material may be used.

The upper portion of the vessel D is provided with a plurality of longitudinally disposed and spaced apart enlargements 8, shown as four in number, and whose lower ends are horizontal, forming shoulders 9 which rest upon the internal, annular shoulder 7 of the steam ring and thus support the inner vessel A in the steam ring, as shown in Fig. 2. Beneath each of the shoulders 9 are the centering lugs 10 which taper downwardly into the wall of the vessel and which serve the double purpose of properly centering the vessel D as it is inserted downwardly in place, and holding it against material lateral movement by contact with the lower extremity of the steam ring. The top of the vessel D is provided with laterally extending and spaced apart bosses 11 which by contact with the upper wall of the steam ring aid in holding the inner vessel in position relative to the steam ring. The bosses 11 are preferably alined with and are conveniently formed on the top of the enlargements 8.

Thus clear spaces or passages 12 are formed around the inner vessel A and between the same and the steam ring.

It is evident that the steam will arise from the lower portion of the vessel A, up through the passages 12 and also passing around the outside of the bosses 9, thereby surrounding the entire wall of the inner vessel D with live steam, and thus thoroughly and uniformly cooking the contents of the inner vessel. The steam also ascends into the inclosed space above the vessel D, thus effecting a complete envelopment of the vessel D and its contents in the steam.

The lid C should fit loosely on the top of the steam ring B, thus permitting the escape of steam and preventing explosion or the sudden blowing out of a quantity of accumulated or compressed steam.

The joint between the steam ring B and the outer vessel A is tight, so that there is no loss of steam at this point.

However, the lid C may fit tightly on the steam ring and be provided with a port or small hole for the escape of the steam.

What I desire to claim is:—

1. A steam cooker comprising an outer vessel adapted to contain water for the generation of steam, a steam ring provided with an exterior annular shoulder adapted to fit down on the top of said outer vessel with the lower portion of said steam ring depending into said outer vessel and holding the steam ring against lateral displacement, said lower portion of the steam ring being provided with an internal annular shoulder having a substantially horizontal supporting portion, an inner vessel adapted to be supported within the outer vessel, a plurality of spaced shoulders on the exterior of said inner vessel, said shoulders being intermediate of the vertical extent of said inner vessel and being arranged in annular series around the same, and said shoulders resting upon the supporting portion of the internal annular shoulder of the steam ring, and a lid for the top of said steam ring.

2. A steam cooker comprising an outer vessel adapted to contain water for the generation of steam, a steam ring provided with an exterior annular shoulder adapted to fit down on the top of said outer vessel with the lower portion of said steam ring depending into the outer vessel and holding the steam ring against lateral displacement, said lower portion of the steam ring being provided with an internal annular shoulder having a substantially horizontal supporting portion, an inner vessel adapted to be supported within the outer vessel, a plurality of spaced shoulders on the exterior of said inner vessel, said shoulders being intermediate of the vertical extent of said inner vessel and being arranged in annular series around the same, and said shoulders resting upon the supporting portion of the internal annular shoulder of the steam ring, means for centering said inner vessel with its circumferential wall spaced inwardly from said steam ring, and a lid for the top of said steam ring.

3. A steam cooker comprising an outer vessel adapted to contain water for the generation of steam, a steam ring provided with an exterior annular shoulder adapted to fit down on the top of said outer vessel with the lower portion of said steam ring depending into the outer vessel and holding the steam ring against lateral displacement, said lower portion being provided with an internal annular shoulder having a substantially horizontal supporting portion, an inner vessel adapted to be supported within the outer vessel, a plurality of spaced shoulders on the exterior of said inner vessel, said shoulders being intermediate of the vertical extent of said inner vessel and being arranged in annular series around the same, and said shoulders resting upon the supporting portion of the internal annular shoulder of the steam ring, radially disposed and spaced apart bosses on the upper end of the inner vessel to center the latter in relation to said steam ring with its circumferential wall spaced inwardly therefrom, and a lid for the top of said steam ring.

4. A steam cooker comprising an outer vessel adapted to contain water for the generation of steam, a steam ring provided with an exterior annular shoulder adapted to fit down on the top of said outer vessel with the lower portion of said steam ring depending into the outer vessel and holding the steam ring against lateral displacement, said lower portion being provided with an internal annular shoulder having a substantially horizontal supporting portion, an inner vessel adapted to be supported within the outer vessel, a plurality of spaced shoulders on the exterior of said inner vessel, said shoulders being intermediate of the vertical extent of said inner vessel and being arranged in annular series around the same, and said shoulders resting upon the supporting portion of the internal annular shoulder of the steam ring, downwardly tapered projections on the wall of the inner vessel beneath said shoulders which act as guides for the inner vessel to properly position it in relation to the steam ring as said inner vessel is lowered into place, and a lid for said steam ring.

5. A steam cooker comprising an outer vessel adapted to contain water for the generation of steam, a steam ring provided with an exterior annular shoulder adapted to fit down on the top of said outer vessel with the lower portion of said steam ring depending into the outer vessel and holding the steam ring against lateral displacement, said lower portion being provided with an internal annular shoulder having a substantially horizontal supporting portion, an inner vessel adapted to be supported within the outer vessel, a plurality of spaced shoulders on the exterior of said inner vessel, said shoulders being intermediate of the vertical extent of said inner vessel and being arranged in annular series around the same, and said shoulders resting upon the supporting portion of the internal annular shoulder of the steam ring, downwardly tapered projections on the wall of the inner vessel beneath said shoulders which act as guides for the inner vessel to properly position it in relation to the steam ring as said inner vessel is lowered into place, radially disposed and spaced apart bosses on the upper end of said inner vessel to center the same in relation to said steam ring with its circumferential wall of the inner vessel spaced inwardly from the wall of the steam ring, and a lid for the top of the steam ring.

Signed at Pittsburgh, Pa., this 9th day of January, 1923.

JOSEPH AUDLEY PIERCE.